(12) United States Patent
Chung

(10) Patent No.: US 6,778,555 B1
(45) Date of Patent: Aug. 17, 2004

(54) VOICE OVER PACKET SYSTEM CONFIGURED TO CONNECT DIFFERENT FACSIMILE TRANSMISSION PROTOCOLS

(75) Inventor: Wing-Kuen Chung, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/321,898

(22) Filed: May 28, 1999

(51) Int. Cl.[7] .............................. H04J 3/16; H04L 12/66
(52) U.S. Cl. ....................... 370/467; 370/352; 370/493
(58) Field of Search ................................ 370/465, 467, 370/352, 356, 400, 401, 493, 495, 474, 473, 419, 469, 395; 375/133, 220, 222, 240.23

(56) References Cited

U.S. PATENT DOCUMENTS

| | | | |
|---|---|---|---|
| 4,747,130 A | 5/1988 | Ho | |
| 4,862,452 A | 8/1989 | Milton et al. | |
| 4,955,054 A | 9/1990 | Boyd, Jr. et al. | |
| 4,991,169 A | 2/1991 | Davis et al. | |
| 5,150,357 A | 9/1992 | Hopner et al. | |
| 5,224,099 A | 6/1993 | Corbalis et al. | |
| 5,313,454 A | 5/1994 | Bustini et al. | |
| 5,359,592 A | 10/1994 | Corbalis et al. | |
| 5,410,599 A | 4/1995 | Crowley et al. | |
| 5,434,981 A | 7/1995 | Lenihan et al. | |
| 5,442,789 A | 8/1995 | Baker et al. | |
| 5,497,373 A | 3/1996 | Hulen et al. | |
| 5,515,363 A | 5/1996 | Ben-Nun et al. | |
| 5,526,344 A | 6/1996 | Diaz et al. | |
| 5,528,595 A | 6/1996 | Walsh et al. | |
| 5,561,663 A | 10/1996 | Klausmeier | |
| 5,594,727 A | 1/1997 | Kolbenson et al. | |
| 5,602,848 A | 2/1997 | Andrews et al. | |
| 5,615,211 A | 3/1997 | Santore et al. | |
| 5,623,491 A | 4/1997 | Skoog | |
| 5,719,865 A | 2/1998 | Sato | |
| 5,724,513 A | 3/1998 | Ben-Nun et al. | |
| 5,734,656 A | 3/1998 | Prince et al. | |
| 5,742,596 A | 4/1998 | Baratz et al. | |
| 5,765,032 A | 6/1998 | Valizadeh | |
| 5,771,232 A | 6/1998 | Sinibaldi et al. | |
| 5,793,747 A | 8/1998 | Kline | |
| 5,835,494 A | 11/1998 | Hughes et al. | |
| 5,838,994 A | 11/1998 | Valizadeh | |
| 5,862,211 A | 1/1999 | Roush | |
| 5,883,804 A | 3/1999 | Christensen | |
| 5,894,477 A | 4/1999 | Brueckheimer et al. | |
| 5,940,479 A | 8/1999 | Guy et al. | |

(List continued on next page.)

OTHER PUBLICATIONS

S. Mangiapane, "Cisco Announces MC3810 Multiservice Access Concentrator," The Databus, vol. 37, No. 6, pp. 1–3, Oct.–Nov. 1997.

Voice Over Frame Relay Implementation Agreement, FRF 11.1, Frame Relay Forum Technical Committee, pp. I–vi and 1–46 (Revision History: FRF.11 May 1997; FRF 11.1 Annex J Added Dec. 1998).

(List continued on next page.)

*Primary Examiner*—Hanh Nguyen
(74) *Attorney, Agent, or Firm*—Blakely, Sokoloff, Taylor & Zafman LLP

(57) ABSTRACT

A method for selecting a transmission protocol for a voice over packet system (VOPS) is disclosed. The method comprises generating a first data comprising a plurality of transmission protocols. The method also comprises transmitting the first data to a remote VOPS. Additionally, the method comprises receiving a second data from the remote VOPS. The second data selects at least one of the plurality of transmission protocols.

30 Claims, 3 Drawing Sheets

U.S. PATENT DOCUMENTS

| | | | |
|---|---|---|---|
| 5,991,292 A | * | 11/1999 | Focsaneanu et al. ......... 370/352 |
| 6,009,507 A | | 12/1999 | Brooks et al. |
| 6,028,858 A | | 2/2000 | Rivers et al. |
| 6,058,117 A | | 5/2000 | Ennamorato et al. |
| 6,075,784 A | * | 6/2000 | Frankel et al. ............... 370/356 |
| 6,104,721 A | | 8/2000 | Hsu |
| 6,118,864 A | | 9/2000 | Chang et al. |
| 6,181,694 B1 | | 1/2001 | Pickett |
| 6,205,148 B1 | * | 3/2001 | Takahashi et al. ........... 370/401 |
| 6,208,658 B1 | * | 3/2001 | Pickett ........................ 370/401 |
| 6,266,342 B1 | | 7/2001 | Stacey et al. |
| 6,278,697 B1 | * | 8/2001 | Brody et al. ................. 370/466 |
| 6,285,671 B1 | * | 9/2001 | Bossemeyer, Jr. et al. .. 370/352 |
| 6,292,480 B1 | * | 9/2001 | May ............................ 370/352 |
| 6,385,192 B1 | * | 5/2002 | Kozdon et al. .............. 370/352 |
| 6,385,195 B2 | * | 5/2002 | Sicher et al. ................ 370/356 |
| 6,463,051 B1 | * | 10/2002 | Ford ............................ 370/352 |
| 6,542,498 B2 | * | 4/2003 | Socaciu ....................... 370/352 |

OTHER PUBLICATIONS

*Annex B to Voice Over Frame Relay Implementation Agreement, FRF .11*, Frame Relay Forum Technical Committee, pp. B–1 & B–2 (May 1997).

R. Iyer & Cisco Systems, *A TDM Interface for the TMS320C54X DSP, Application Report: SPRA453*, Digital Signal Processing Solutions (Texas Instruments Jun. 1998).

Doug O'Leary, Frame Relay/ATM PVC Service Interworking Implementation Agreement, book, Apr. 14, 1995, Document No. FRF.8, USA, 24 pages.

Gary Lee and Keith Mumford, "A Management Briefing on Frames to Cells", book, 1997, General Datacomm, Middlebury, Connecticut, USA, pp. 4–18.

Addison Ching, "CEDPA Launches Discussion Lists", pamphlet, Oct.–Nov. 1997, vol. 37, No. 6, The DataBus, Huntington Beach, CA USA, 10 pages.

Edward B. Morgan, "Voice Over Packet", Technology Networks, Inc. White Paper, 14 pages, 1997.

Thompson, B.; Grosen, M.; Wilson, S. "DSP Resource Manager Interface and its role in DSP multimedia", internet article, Combined Volumes, Electro/94 International, Santa Barbara, CA USA, 8 pages, 1994.

Doug O'Leary, Voice over Frame Relay Implementation Agreement, FRF.11.1, Frame Relay Forum Technical Committee, Dec., 1998.

\* cited by examiner

VOICE OVER PACKET SYSTEM CONFIGURED TO CONNECT DIFFERENT FACSIMILE TRANSMISSION PROTOCOLS

FIELD OF THE INVENTION

The present invention relates to a protocol negotiations mechanism that allows a facsimile transmission between two systems. More particularly, the present invention relates to using a synthesized packet to negotiate transmission protocols between two voice over packet systems.

BACKGROUND

Developments in router technology have led to system designs that provide a general-purpose connection-oriented transfer mode for a wide range of services. These services include the simultaneous transfer of integrated traffic (data, voice, and video traffic) over the same network system. Typically, in the prior art, a voice over packet system ("VOPS") is used as an interface between the network system and the devices that generate data, voice, or video traffic. The VOPS provides a digital signal processor ("DSP") to convert data between analog signals and digital signals prior to data transmission over the network system. The VOPS also provides multiple code/decode ("codec") devices to both compress data prior to transmission and decompress received data, thus reducing data congestion over the network system.

FIG. 1 shows a prior art voice over packet network system. In particular, system 100 includes a voice over packet system ("VOPS") 120 coupled to network 130 via an input/output serial line (161). Network 130 typically includes either a Frame Relay network, an Asynchronous Transfer Mode ("ATM") network, a High-level Data Link Control ("HDLC") network, or and Internet Protocol ("IP") network. Network 130 provides a transmission media between VOPS 120, node 140, and node 150.

As illustrated in FIG. 1, VOPS 120 includes a phone (110) and a facsimile (115) connected to a physical port (105). Physical port 105, in turn, is coupled to a DSP (125) and a codec bank (135). Codec bank 135 includes a group of codec devices (C1, C2, C3, and C4) that determine the transmission and compression protocol performed by DSP 125. For example, codec C1 includes a G.729 compression algorithm that compresses a 64,000 bits (i.e. 64K) voice call into an eight thousand bits compressed data stream. Thus, to maintain a voice call from phone 110 to phone 145 of node 140, DSP 125 uses the compression algorithm in codec C1 to generate a digital stream that is packetized and transmitted across network 130. Subsequently, the digital data is decompressed and reconstructed as analog signal by a DSP device included in node 140. The analog signal is transferred to phone 145. The data decompression performed by the DSP of node 140 is possible because the G.729 is an industry standard used to compress/decompress voice data.

Following the previous example, a data transmission from facsimile 115 to node 140 may require that DSP 125 uses a facsimile image algorithm located in codec C2. Provided node 140 supports the facsimile image algorithm of codec C2, a facsimile transmission between VOPS 120 and node 140 is possible. If the facsimile image algorithm of coded C2 is not supported by node 140, however, the data transmission from facsimile 115 to node 140 may fail. Thus, system 100 results in numerous disadvantages when used in a heterogeneous networking system that supports multiple codec devices between different nodes. One disadvantage results from the inability to transmit facsimile data that does not follow an industry standard codec algorithm. Another disadvantage results from the inability to transmit data between multiple voice over packet systems that prioritize transmission protocols differently. Yet another disadvantage results from the inability to transmit facsimile data between a VOPS that supports a propriety transmission protocol to a VOPS that supports a non-propriety protocol.

SUMMARY OF THE INVENTION

It is therefore an object of the invention to provide a protocol negotiations mechanism that allows a facsimile transmission between a voice over packet system ("VOPS") and a remote VOPS.

It is a further object of the invention to provide a VOPS that comprises a table with supported codec algorithms. The supported codec algorithms are used to facilitate protocol negotiations between the VOPS and a remote VOPS.

It is a further object of the invention to provide a VOPS that transmits a switchover facsimile packet to facilitate protocol negotiations between the VOPS and a remote VOPS.

These and other objects of the invention are provide by a method for selecting a transmission protocol for a voice over packet system (VOPS). The method comprises generating a first data comprising a plurality of transmission protocols. For one embodiment, the VOPS is operable to receive data using the plurality of transmission protocols. The method also comprises transmitting the first data to a remote VOPS. Additionally, the method comprises receiving a second data from the remote VOPS. The second data selects at least one of the plurality of transmission protocols. For another embodiment, the remote VOPS transmits data to the VOPS according to one of the selected plurality of transmission protocols.

Other objects, features, and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A method for providing a protocol negotiations mechanism between a voice over packet system ("VOPS") and a remote VOPS is disclosed. The VOPS comprises a table that includes information material to the data transmission. For one embodiment, the table identifies codec algorithms used by a digital signal processor ("DSP") of the VOPS. In particular, the table identifies the vendor, revision number, or release information of the facsimile codecs supported by the VOPS. Accordingly, a facsimile receiving VOPS uses the table to inform the transmitting VOPS of possible facsimile transmission protocols supported by the receiving VOPS.

For one embodiment, a facsimile receiving VOPS transmits a synthesized voice packet to a facsimile transmitting VOPS. The synthesized voice packet comprises the facsimile transmission protocols supported by the receiving VOPS. For another embodiment, the transmitting VOPS transmits a reply synthesized voice packet indicating the facsimile transmission protocol used to maintain a subsequent facsimile transmission.

For yet another embodiment, the synthesized voice packet comprises a priority list of the facsimile transmission protocols supported by the receiving VOPS. Thus, the facsimile transmitting VOPS selects a transmission protocol according to the priority list denoted by the synthesized voice packet.

An intended advantage of an embodiment of the invention is to provide a protocol negotiations mechanism that allows a facsimile transmission between a VOPS and a remote VOPS. Another intended advantage of an embodiment of the invention is to provide a VOPS that comprises a table with supported codec algorithms. The supported codec algorithms are used to facilitate a protocol negotiations between the VOPS and a remote VOPS. For one embodiment, the protocol negotiations comprises the selection of a specific codec in both the VOPS and the remote VOPS. For another embodiment, the protocol negotiations comprises the selection of a specific facsimile-image algorithm in both the VOPS and the remote VOPS. Yet another intended advantage of an embodiment of the invention is to provide a VOPS that transmits a switchover facsimile packet to facilitate a protocol negotiations between the VOPS and a remote VOPS.

Figure 1:
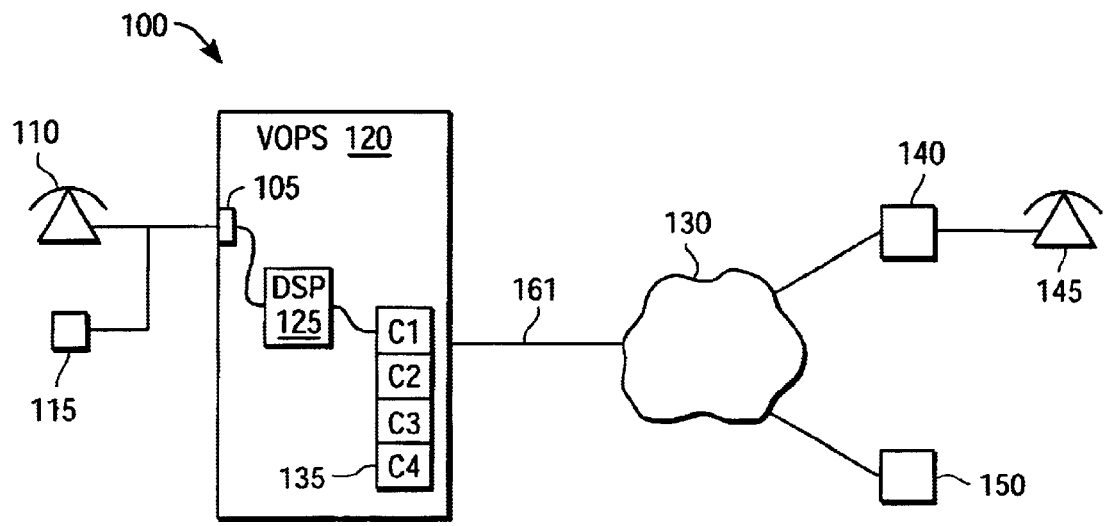
FIG. 1 shows a prior art voice over packet network system.
Figure 2:
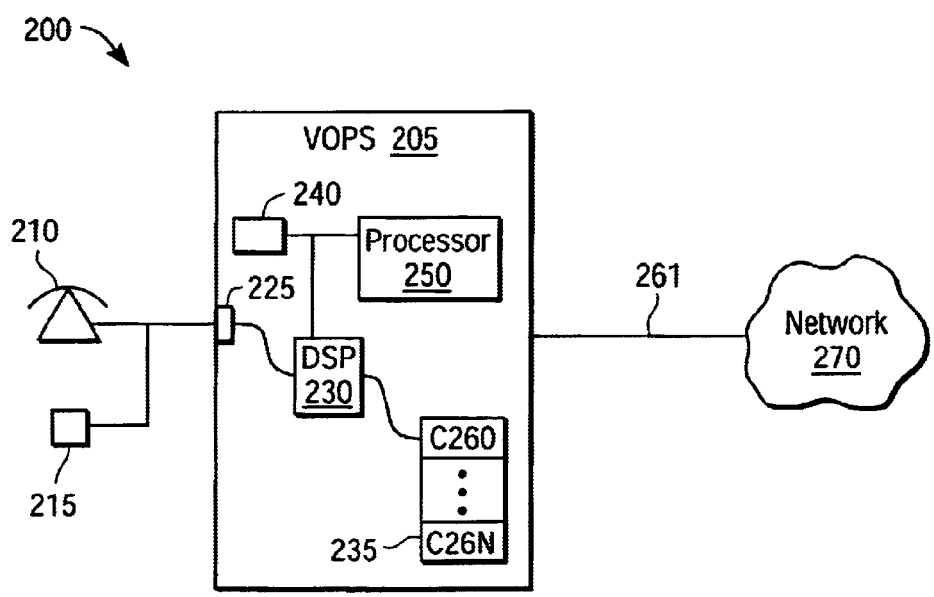
FIG. 2 illustrates one embodiment of a voice over packet system.

FIG. 2 illustrates one embodiment of a voice over packet system. In particular, system 200 comprises a phone (210) and a facsimile (215) coupled to a physical port (225) of VOPS 205. Physical port 225 is coupled to DSP 230. DSP 230, in turn, is coupled to a bank of code/decode ("codec") devices (235), a codec look-up table (240), and a processor (250).

As illustrated in FIG. 2, VOPS 205 is coupled to a network (270) via an input/output serial line (261). For one embodiment, network 270 comprises a Frame Relay network, an Asynchronous Transfer Mode ("ATM") network, a High-level Data Link Control ("HDLC") network, or an Internet Protocol ("IP") network. Accordingly, VOPS 205 receives either voice, data (from phone 210) or facsimile data (from facsimile 215) on physical port 225 and subsequently transmits the data in a packetized form on network 270. Alternatively, VOPS 205 receives packetized data from network 270, via line 261, and subsequently transfers the received data to phone 210 or facsimile 215.

For one embodiment, VOPS 205 compresses the data received on physical port 225 prior to transmission on line 261. In particular, processor 250 uses codec look-up table 240 to determined a transmission and compression protocol for signals received at physical port 225. Based on the selected transmission and compression protocol, processor 250 loads one of the codec device algorithms (C260–C26n) into DSP 225. Subsequently, DSP 225 compresses the signal received on physical port 225 and generates a digital signal that is packetized and transmitted on line 261.

For example, for one embodiment, codec look-up table 240 indicates that codec C260 of codec bank 235 is used for facsimile transmission. Thus, to transmit facsimile data from facsimile 215 to line 261, processor 250 loads a facsimile-relay image algorithm included in C260 into DSP 225. Subsequently, DSP 225 uses the facsimile-relay image algorithm to change the facsimile data received on physical port 225 from an analog signal to a digital signal. DSP 225 also uses the facsimile-relay image algorithm to compress facsimile data received on physical port 225. After compressing the facsimile data, VOPS 205 transmits packetized segments of the compressed data on line 261.

Following the previous example, for one embodiment, VOPS 205 uses a voice transmission protocol to initiate the facsimile transmission. The voice transmission protocol comprises a dual tone multi-frequency ("DTMF") digit-relay syntax requesting a switch virtual connection ("SVC") or an actual voice call between users, in which verbal communication is used to synchronize the facsimile transmissions. For both initiation schemes, DSP 225 uses a voice protocol compression algorithm (e.g. C261) to establish a communication channel with a remote node. After establishing the communications channel, however, to transmit the facsimile data, processor 250 switches DSP 225 to the facsimile-relay image algorithm included in C260. Hereinafter, the DSP 225 transfer between a voice transmission protocol and a facsimile transmission protocol is referred to as a facsimile switchover.

For one embodiment, prior to a facsimile switchover, a receiving VOPS informs the transmitting VOPS of the facsimile protocols (i.e. facsimile-relay algorithms) used by the receiving VOPS. For an alternative embodiment, the receiving VOPS uses a switchover packet to inform the transmitting VOPS of the facsimile protocols supported by the receiving VOPS. For another embodiment, the transmitting VOPS responds with a reply switchover packet indicating the facsimile protocols supported by both the transmitting VOPS and the receiving VOPS. Subsequently, both the transmitting VOPS and the receiving VOPS perform a facsimile switchover based on the switchover packet and the reply switchover packet, respectively. For yet another embodiment, the switchover packet comprises a synthesized voice packet that is transmitted according to the voice protocol used to establish a communications channel between the two VOPSs. Thus, if a reply switchover packet is not received by the receiving VOPS, the receiving VOPS does not perform a facsimile switchover.

Figure 3:
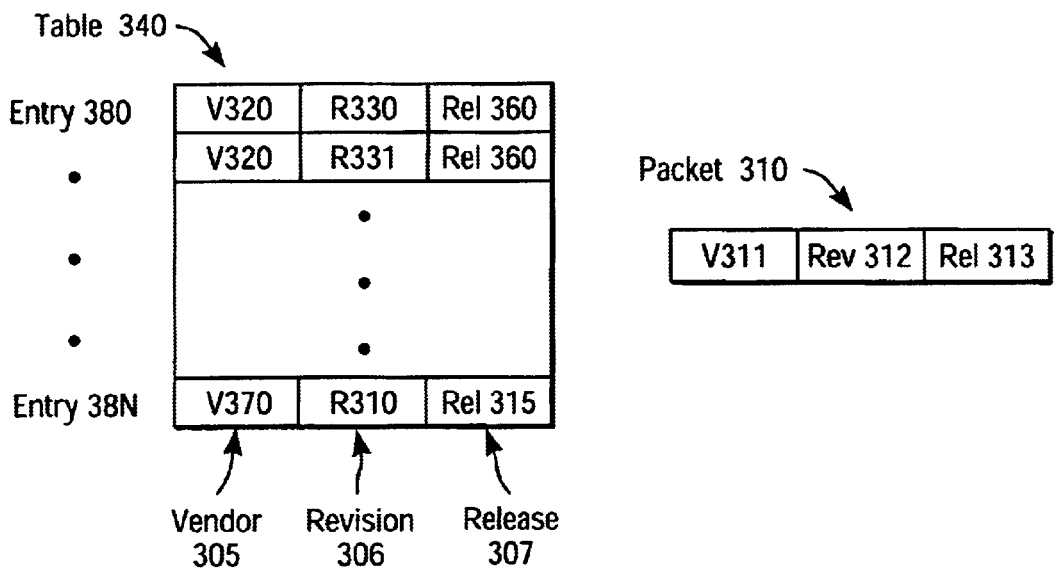
FIG. 3 illustrates one embodiment of a codec table and a switchover packet.

FIG. 3 illustrates one embodiment of a codec table and a switchover packet. In particular table 340 comprises entries 380–38N. For one embodiment, table 340 corresponds to look-up table 240 of system 200. Thus, each entry of table 340 identifies a codec (C260–C26N) of codec bank 235. As illustrated in FIG. 3, each entry of table 340 comprises three fields—a vendor field (305), a revision field (306), and a release field (307). For example, in entry 380, the three fields comprise a vendor field (V320) indicating the vendor of the supported codec; a revision field (R330) indicating the release of the supported codec; and a release field (REL 360) indicating the release number of the supported codec. For alternative embodiments, table 340 comprises additional fields indicating additional parameters of the specific codec.

For one embodiment, a facsimile transmission is sent from a local VOPS to a remote VOPS. Prior to the facsimile transmission, however, the remote VOPS generates and transmits a switchover packet using a remote version of table 340. The switchover packet informs the local VOPS of the facsimile protocols supported by the remote VOPS.

Packet 310 illustrates one embodiment of a switchover packet generated by a facsimile receiving VOPS. For one embodiment, packet 310 comprises a synthesized voice packet that is transmitted from the remote VOPS to the local VOPS. For another embodiment, packet 310 is generated by a processor of the remote VOPS. As illustrated in FIG. 3, packet 310 includes three fields—a vendor field (V 311), a revision field (Rev 312), and a release field (Rel 313). For alternative embodiments, packet 310 comprises additional fields indicating additional parameters of table 340.

The fields of packet 310 allow the local VOPS and the remote VOPS to identify a specific codec prior to facsimile transmission. For example, for one embodiment, packet 310 is used to negotiate a facsimile transmission between two VOPS that support eight possible facsimile protocols with each facsimile protocol having three possible revisions and releases. Accordingly, field V 311 comprises an eight bit field, each bit indicating a specific vendor supported by the receiving VOPS. Additionally, field Rev 312 comprises three bits for each bit of field V 311. The three bits correspond to the three possible revision numbers supported for a given vendor. Similarly, field Rel 313 comprises three bits for each bit of field V 311. The three bits corresponds to the three possible releases supported for a given vendor. Thus, the transmission of packet 310 to the facsimile transmitting VOPS allows the facsimile transmitting VOPS to selects a facsimile protocol—i.e. a facsimile image algorithm determined by vendor, release and revision— supported by the receiving VOPS. Subsequently, the transmitting VOPS transmits the facsimile according to the selected facsimile protocol.

The transmission of a switchover packet allows the facsimile receiving VOPS to indicate the different transmission protocols supported by the receiving VOPS. The transmitting VOPS, however, may only support a subset of the facsimile protocols used by the transmitting VOPS. Thus, for one embodiment, the transmitting VOPS generates a reply switchover packet to indicate the facsimile protocols supported by both the transmitting VOPS and the receiving VOPS.

For another embodiment, the facsimile initiation time between the two VOPS is time critical. Thus, each field of the switchover packet includes a duplicate field having a "0" value. Thus, during the generation of the reply switchover packet, the transmitting VOPS marks the duplicate fields where both the transmitting VOPS and the receiving VOPS support the same protocol. For one embodiment, the transmitting VOPS marks the duplicate fields with nonzero values. For another embodiment, the transmitting VOPS marks the duplicate fields with the same values included in the switchover packet.

Figure 4:
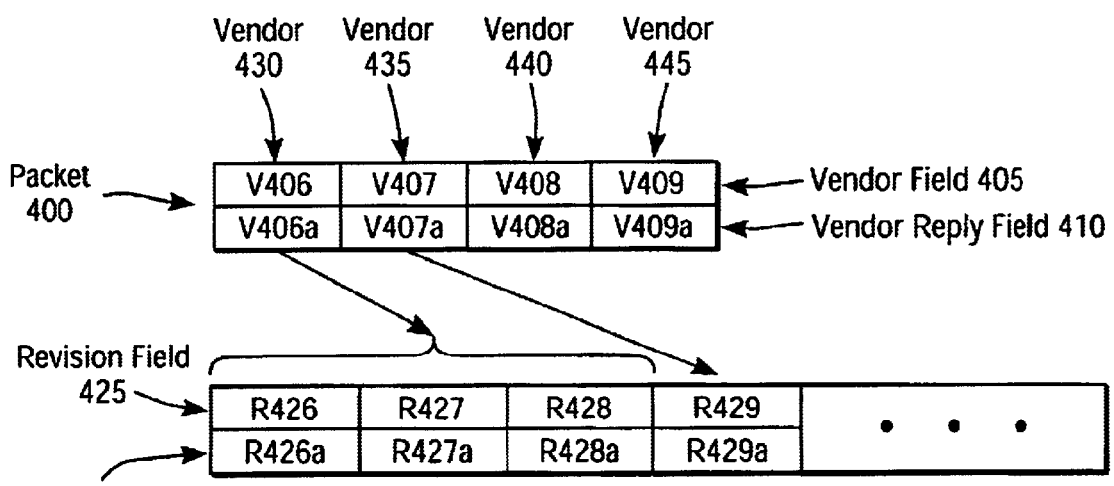
FIG. 4 illustrates one embodiment of a switchover packet and a reply switchover packet.

FIG. 4 illustrates one embodiment of a switchover packet and a reply switchover packet. In particular, packet 400 comprises a vendor field (405 and 410) and a revision field (425 and 420). For one embodiment, vendor field 405 and 410 comprises four one bit values. Accordingly, each bit of vendor field 405 (V406–V409) corresponds to a different vendor. Additionally, each vendor corresponds to three possible revision numbers. For example, V406 corresponds to R426, R427 and R428.

During the initial transmission of packet 400—i.e. when packet 400 is used as a switchover packet—all the fields corresponding to the vendor reply fields (410) and the revision reply fields (420) are set to a "0" value. The fields corresponding to facsimile protocol supported by the receiving VOPS, however, are marked. For example, if the look-up table of the receiving VOPS indicates that vendor 430 and vendor 440 are supported, both V406 and V408 are set to a value of "1." Additionally, the revision fields (425) corresponding to both V406 and V408 include the revision numbers of vendor 430 and vendor 440. Thus, if the receiving VOPS supports revision four and revision six of vendor 430, a value of four is written into field R426 and a value of six is written into R427.

As previously described, the reply switchover packet only fills in values for supported facsimile protocols. Thus, following the previous example, for one embodiment the transmitting VOPS supports vendor 430 revision six and vendor 445 revision nine. Accordingly, in the reply switchover packet the vendor reply fields (410) and the revision reply fields (420) remain a "0" value with the exception of V406a which is set to a value of "1" and R427a which is set to a value of six. Subsequently, the transmitting VOPS transmits the facsimile using a vendor 430 revision six protocol—i.e. a facsimile-image algorithm or a codec of vendor 430 revision six is used to compress the facsimile data prior to transmission. Similarly, the receiving VOPS uses the reply switchover packet (i.e. the vendor 430 revision six protocol identified in the reply switchover packet) to process the transmitted (or alternatively received) facsimile data.

For one embodiment, both the transmitting VOPS and the receiving VOPS use a codec tables that prioritizes facsimile protocols similarly. Thus, in the event the reply switchover packet identifies multiple versions, the highest priority vendor is used during the facsimile transmission. For an alternative embodiment, however, the transmitting VOPS and the receiving VOPS prioritizes facsimile protocols differently. Accordingly, to negotiate a prioritization scheme the switchover packet includes a priority field.

Figure 5:
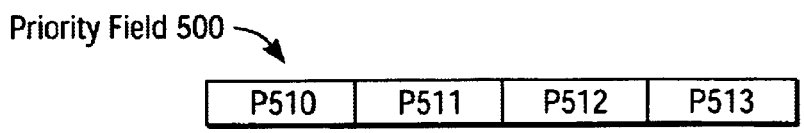
FIG. 5 illustrates one embodiment of a priority field included in a switchover packet.

FIG. 5 illustrates one embodiment of a priority field included in a switchover packet. In particular, priority field 500 comprises bit pairs P510–P513. For one embodiment, priority field 500 is used in conjunction with packet 400 of FIG. 4. Thus, the bit pairs (P510–P513) correspond to vendor 430–vendor 445. For example, to identify a protocol priority in descending order (from highest priority to lowest priority) of vendor 440, vendor 435, vendor 430 and vendor 445 bit pairs P510, P511, P512 and P513 include the value "10," "01, "00," and "11," respectively. Thus, if the transmitting VOPS supports multiple vendors, the transmitting VOPS uses the bit pair values to determine a specific transmission vendor. For alternative embodiment, priority field 500 is used to prioritize a large number of vendors, accordingly the number of bits use in P510, P511, P512 and P513 is increased.

Figure 6:
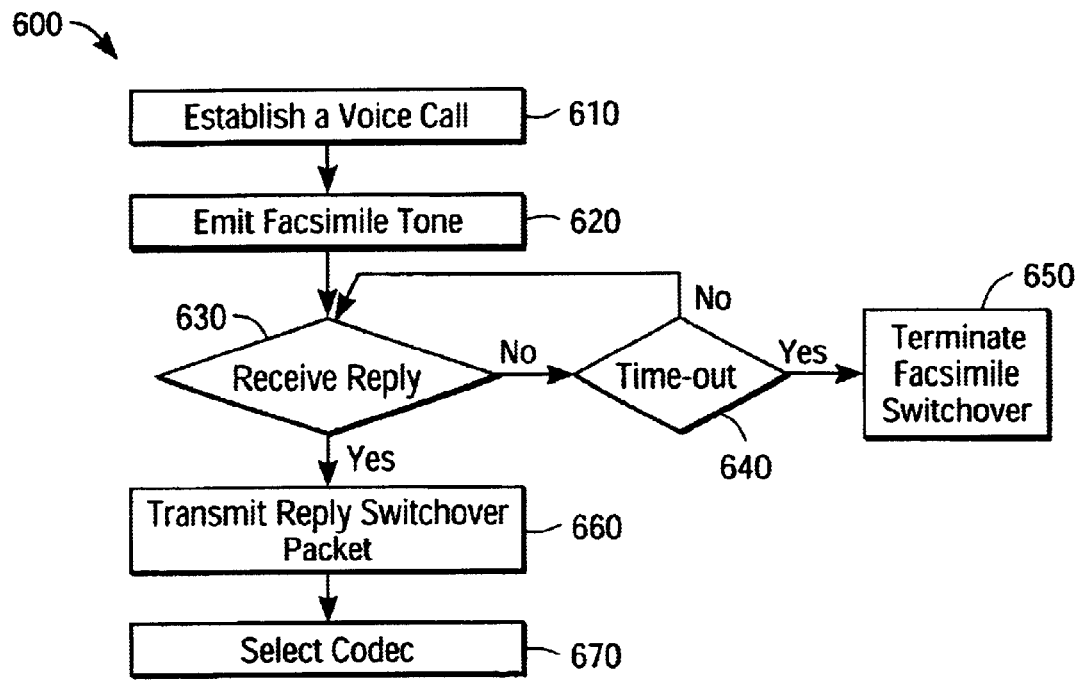
FIG. 6 shows one embodiment of a flow chart illustrating a protocol negotiations by a facsimile transmitting voice over packet systems.

FIG. 6 shows one embodiment of a flow chart illustrating protocol negotiation between two voice over packet systems. In particular, flow chart 600 includes blocks 610 through 670. For one embodiment, the blocks show the steps used by a facsimile transmitting VOPS (hereinafter the transmitting VOPS) to select a facsimile data transmission protocol—i.e. perform a facsimile switchover using a negotiated facsimile protocol. For example, applying the steps of blocks 610 through 670 to VOPS 205, the blocks show the steps used by VOPS 205 to determined which codec device from the bank of codec devices 235 will be used to transmit a facsimile over network 270.

As illustrated in FIG. 6, operation begins in block 610. At block 610, the transmitting VOPS establishes a voice call with a facsimile receiving VOPS (hereinafter the receiving VOPS) coupled to network 270. For one embodiment, the voice call comprises a dual tone multi-frequency ("DTMF") digit-relay syntax requesting a switch virtual connection ("SVC"). For another embodiment, the voice call comprises an actual voice call between users, in which verbal communication is used to synchronize the facsimile transmissions. After the voice call is established, block 620 is processed.

At block 620, the transmitting VOPS emits a facsimile tone. The facsimile tone informs the receiving VOPS that a facsimile transmission is forthcoming. For one embodiment, the facsimile tone comprises a low speed tone transmitted at three hundred bits per second. For another embodiment, the DSP of the transmitting VOPS generates the facsimile tone. After block 620 is processed, block 630 is processed.

At decision block 630, the transmitting VOPS determines whether the receiving VOPS has responded to the facsimile tone. For one embodiment, the receiving VOPS responds with switchover packet. The operation of the receiving VOPS is described below in conjunction with FIG. 7. For another embodiment, the transmitting VOPS examines incoming packets received on an input (261) of the receiving VOPS to determine whether a switchover packet has been transmitted by the receiving VOPS. If the reply switchover packet is received, block 660 is processed. If the reply switchover packet is not received, however, decision block 640 is processed.

At decision block 640, the receiving VOPS determines whether a predetermined time period has elapsed after the transmission of the facsimile tone. For one embodiment, the predetermined time period equals two hundred milliseconds. If the predetermined time has not elapsed, decision block 630 is re-processed. For one embodiment, however, the receiving VOPS does not respond to the facsimile tone. Thus, the receiving VOPS does not transmit a switchover packet. Accordingly, the transmitting VOPS does not receive a switchover packet within the predetermined time period. If the predetermined time has elapsed block 650 is processed and the transmitting VOPS terminates the facsimile switchover.

As previously described, if a switchover packet is received by the receiving VOPS, block 660 is processed. In block 660, the transmitting VOPS transmits a reply switchover packet indicating the facsimile transmission protocols supported by the transmitting VOPS. Subsequently, block 670 is processed. In block 670, the transmitting VOPS selects a facsimile protocol (or codec from codec bank 235) based on the facsimile protocol identified in the reply switchover packet.

Figure 7:
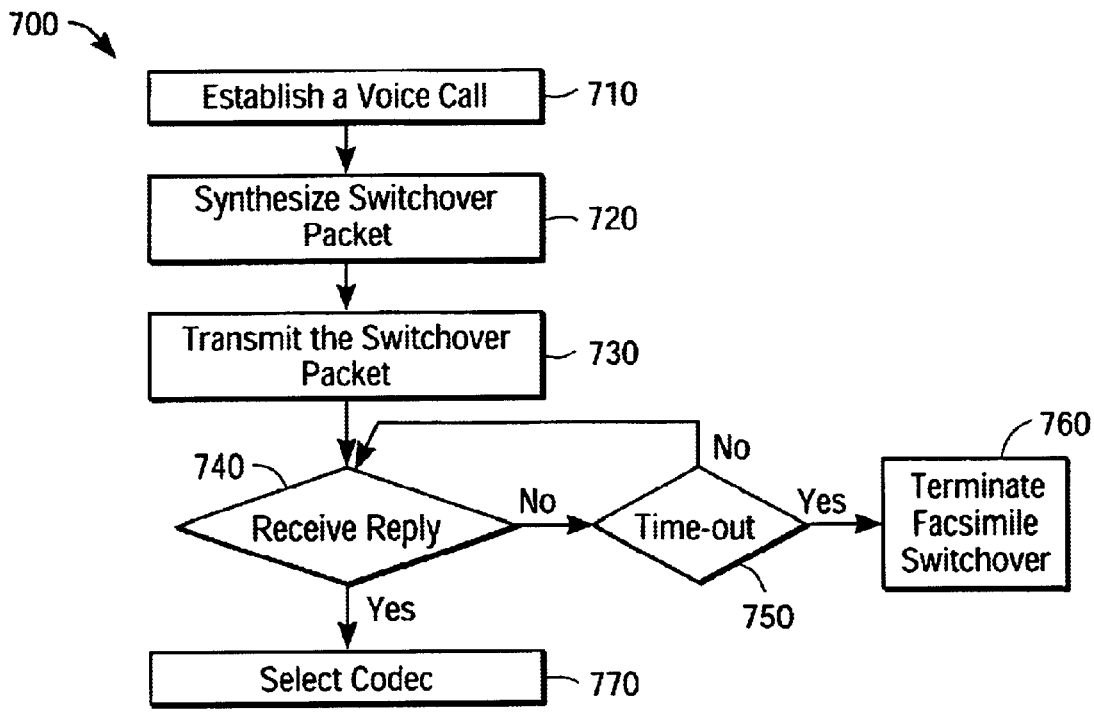
FIG. 7 shows one embodiment of a flow chart illustrating a protocol negotiations by a facsimile receiving voice over packet systems.

FIG. 7 shows one embodiment of a flow chart illustrating protocol negotiation between two voice over packet systems. In particular, flow chart 700 includes blocks 710 through 770. For one embodiment, the blocks show the steps used by a facsimile receiving VOPS (hereinafter the receiving VOPS) to select a facsimile data transmission protocol— i.e. perform a facsimile switchover using a negotiated facsimile protocol. For example, applying the steps of blocks 710 through 770 to VOPS 205, the blocks show the steps used by VOPS 205 to determined which codec device from the bank of codec devices 235 will be used to receive a facsimile transmission on network 270.

As illustrated in FIG. 7, operation begins in block 710. At block 710, the receiving VOPS establishes a voice call with the transmitting VOPS. For one embodiment, the voice call comprises a connection signal in response to a DTMF signal generated by a facsimile transmitting VOPS coupled to network 270 (hereinafter the transmitting VOPS). For another embodiment, the voice call comprises an actual voice call between users, in which verbal communication is used to synchronize the facsimile transmissions. After the voice call is established, block 720 is processed.

At block 720, the receiving VOPS generates a switchover packet. For one embodiment, a processor (250) of the receiving VOPS transmits the switchover packet. For another embodiment, the switchover packet comprises a synthesized voice packet. For yet another embodiment, the switchover packet comprises a list of facsimile protocols stored in a codec look-up table (240) of the receiving VOPS. After the switchover packet is generated, the receiving VOPS transmits the switchover packet in block 730. Subsequently, decision block 740 is processed.

At decision block 740, the receiving VOPS determines whether the transmitting VOPS has responded to the switchover packet with a reply switchover packet. For one embodiment, the receiving VOPS examines incoming packets received on an input (261) of the receiving VOPS to determine whether a reply switchover packet has been transmitted by the transmitting VOPS. If the reply switchover packet is received, block 770 is processed. If the reply switchover packet is not received, however, decision block 750 is processed.

At decision block 750, the receiving VOPS determines whether a predetermined time period has elapsed after the transmission of the switchover packet. For one embodiment, the predetermined time period equals two hundred milliseconds. If the predetermined time has not elapsed, decision block 740 is re-processed. For one embodiment, however, the transmitting VOPS does not support the facsimile protocols identified in the switchover packet. Thus, the transmitting VOPS does not transmit a reply switchover packet. Accordingly, the receiving VOPS does not receive a switchover packet within the predetermined time period. If the predetermined time has elapsed block 760 is processed and the receiving VOPS terminates the facsimile switchover.

As previously described, if a reply switchover packet is received by the receiving VOPS, block 770 is processed. In block 770, the receiving VOPS selects a facsimile protocol (or codec from codec bank 235) based on the facsimile protocol identified in the reply switchover packet.

In the foregoing specification, the invention has been described with reference to specific exemplary embodiments thereof. For example, for one embodiment it is contemplated that the protocol negotiations between voice over packet systems allow for the transmission of facsimile data. It will, however, be evident that the protocol negotiations between voice over packets system may be modified to allow for the transmission of other forms of data including, but not limited to, voice or video. Furthermore, it will be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method for selecting a transmission protocol for a voice over packet system (VOPS), the method comprising:
   generating a first data comprising a plurality of transmission protocols, wherein the VOPS is operable to receive data using the plurality of transmission protocols;
   transmitting the first data to a remote VOPS;
   receiving a second data from the remote VOPS, wherein the second data selects at least one of the plurality of transmission protocols; and processing a data transmission of the remote VOPS, wherein the processing is configured to decompress the data transmission using one of the selected plurality of transmission protocols.

2. The method of claim 1, wherein the processing is further configured to change the transmitted data from a first medium to a second medium.

3. The method of claim 2, wherein the first medium comprises a digital signal.

4. The method of claim 2, wherein the second medium comprises an analog signal.

5. The method of claim 1, further comprising selecting the plurality of transmission protocols from a table.

6. The method of claim 1, further comprising determining a fax transmission request prior to the generation of the first data.

7. The method of claim 6, wherein the plurality of transmission protocols comprise a plurality of fax image algorithms.

8. The method of claim 1, wherein first data comprises a packet.

9. The method of claim 8, wherein the packet comprises a switchover packet.

10. The method of claim 9, wherein the packet comprises an asynchronous transfer mode ("ATM") packet.

11. The method of claim 9, wherein the packet comprises a Frame Relay packet.

12. A method for selecting a transmission protocol for a remote voice over packet system (VOPS), the method comprising:

receiving a first data comprising a plurality of transmission protocols, wherein a local VOPS is operable to receive data using the plurality of transmission protocols;

transmitting a second data to the remote VOPS, wherein the second data selects at least one of the plurality of transmission protocols; and processing a data transmission to the remote VOPS, wherein the processing is configured to compress the data transmission using one of the selected plurality of transmission protocols.

13. The method of claim 12, wherein the processing is further configured to change the transmitted data from a first medium to a second medium.

14. The method of claim 13, wherein the first medium comprises an analog signal.

15. The method of claim 14, wherein the second medium comprises digital signal.

16. The method of claim 12, further comprising generating the second data.

17. The method of claim 16, wherein generation of the second data is configured to compare the plurality of transmission protocols of the first data to a plurality of table entries.

18. The method of claim 17 wherein generation of the second data is further configured to mark the plurality of transmission protocols of the first data that match the plurality of table entries.

19. The method of claim 12, wherein the plurality of transmission protocols comprise a plurality of fax image algorithms.

20. The method of claim 12, wherein first data comprises a packet.

21. The method of claim 20, wherein the packet comprises a switchover packet.

22. The method of claim 21, wherein the packet comprises an asynchronous transfer mode ("ATM") packet.

23. The method of claim 21, wherein the packet comprises a Frame Relay packet.

24. A voice over packet system (VOPS), comprising:

means for generating a first data comprising a plurality of transmission protocols, wherein the VOPS is operable to receive data using the plurality of transmission protocols;

means for transmitting the first data to a remote VOPS;

means for receiving a second data from the remote VOPS, wherein the second data selects at least one of the plurality of transmission protocols; and means for processing a data transmission of the remote VOPS, wherein the processing is configured to decompress the data transmission using one of the selected plurality of transmission protocols.

25. The voice over packet system of claim 24, further comprising:

means for storing the plurality of transmission protocols; and means for selecting the stored plurality of transmission protocols.

26. A voice over packet system (VOPS), comprising:

means for receiving a first data comprising a plurality of transmission protocols, wherein the VOPS is operable to receive data using the plurality of transmission protocols;

means for transmitting a second data to another VOPS, wherein the second data selects at least one of the plurality of transmission protocols; and means for processing a data transmission to the other VOPS, wherein the processing is configured to compress the data transmission using one of the selected plurality of transmission protocols.

27. The voice over packet system of claim 26, further comprising means for changing the transmitted data from a first medium to a second medium.

28. The voice over packet system of claim 26, further comprising means for comparing the plurality of transmission protocols of the first data to a plurality of table entries.

29. A voice over packet system (VOPS), comprising:

a plurality of codecs to store a plurality of algorithms;

a first digital signal processor configured to receive a signal, the first digital signal processor coupled to the plurality of codecs;

a second processor coupled to the first digital signal processor to load one of the plurality of algorithms into the first digital signal processor based on a protocol selected from a plurality of protocols, and wherein the first digital signal processor is configured to compress the signal based on the one of the plurality of algorithms; and a look-up table coupled to the first digital signal processor and the second processor to store the plurality of protocols, wherein the look-up table comprises a plurality of entries, each of the plurality of entries comprising a plurality of fields.

30. The VOPS of claim 29, wherein the plurality of fields comprises a vendor field, a revision field, and a release field.

* * * * *